March 15, 1949.  D. E. DASHER  2,464,437
POROUS METALLIC STRUCTURE AND
METHOD OF MAKING SAME
Filed Nov. 21, 1945
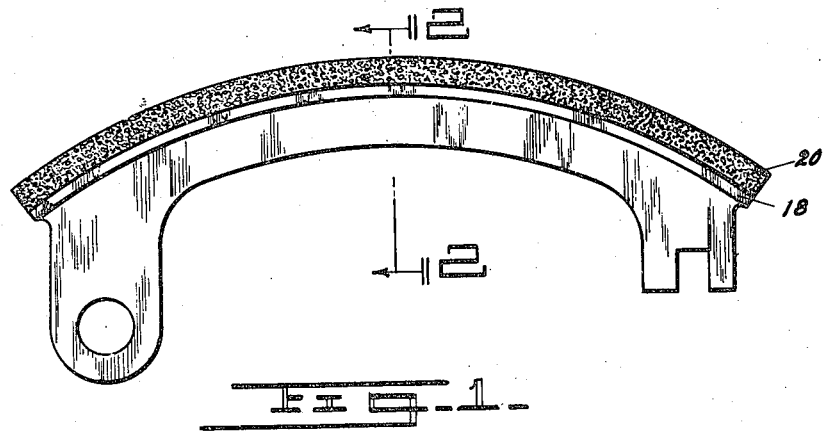
Fig-1-
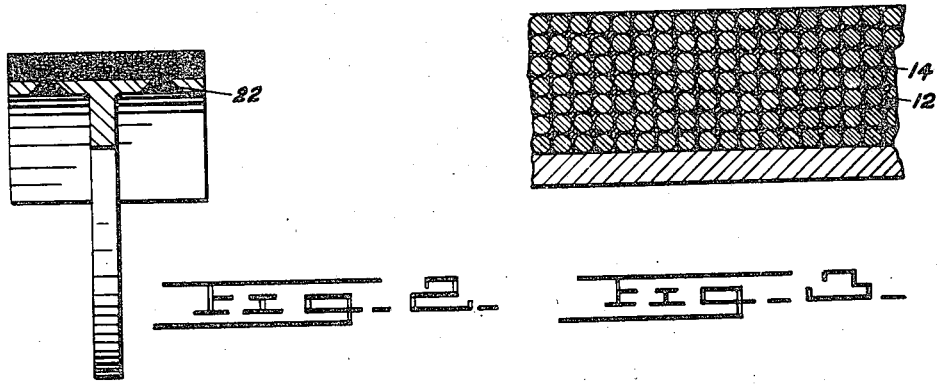
Fig-2-   Fig-3-
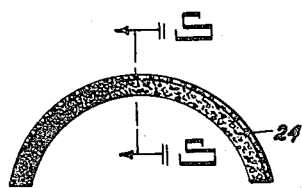   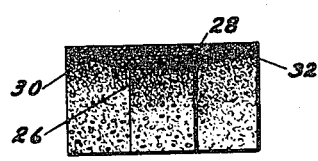
Fig-4-   Fig-5-
INVENTOR.
DON E. DASHER
BY
ATTORNEY Patented Mar. 15, 1949

2,464,437

UNITED STATES PATENT OFFICE 2,464,437

POROUS METALLIC STRUCTURE AND METHOD OF MAKING SAME

Don E. Dasher, Detroit, Mich., assignor to Bendix Aviation Corporation, Detroit, Mich., a corporation of Delaware Application November 21, 1945, Serial No. 629,972

2 Claims. (Cl. 29—191.2)

This invention relates to the fabrication of brake lining and more particularly to the production of a porous composite brake lining impregnated with plastic compounds.

An object of the invention is to provide a porous brake lining that will enable any oil, water or other liquids, which appears at the frictional surfaces, to escape by flowing through the interconnecting voids in the lining.

Another object of the invention is to provide a brake or clutch lining which possesses a high coefficient or thermal conductivity, thus enabling the energy, which appears at the friction surfaces in the form of heat, to be conducted away and dissipated, thereby preventing excessive wear, fading and scoring of the lining.

A further object of the invention is to provide a porous brake or clutch lining, the porosity of which may be varied to produce the desired frictional characteristics.

A salient feature of the invention is the production of a porous composite structure comprising a plurality of individual bodies all conjoined and unified through the medium of a suitable bond.

Another feature of the invention is the provision of a brake or clutch lining, which may be sintered or alloyed directly to the backing material, thereby obviating the necessity of resorting to rivets, as is required in the more conventional types of lining.

It is fundamental that an aggregation, comprising either regular or irregular bodies, will contain voids, which are present in varying proportions, depending upon the size and shape of the individual bodies. It is equally well established that these individual bodies may be united, through the medium of a suitable bond, without destroying either the characteristic contours of the individual bodies or the voids existing between them. It logically follows, therefore, that a plurality of interconnected voids will continue to exist around these individual bodies after they have all been properly and securely conjoined. These various phenomena and known factors are all conveniently utilized in the instant invention.

So far as disclosed in the prior art, little or nothing has been done to develop a porous metallic lining for brakes and clutches, which will conduct both generated heat and objectionable liquid away from frictional surfaces. It is, therefore, a purpose of the instant invention to accomplish these feats.

Broadly, the invention comprehends the fabrication of a porous friction material from individual bodies compacted with a suitable bond and sintered, or otherwise united, to form a unitary mass which may be suitably impregnated with plastic compounds.

More specifically, the invention contemplates the production of a porous composite brake or clutch lining from spherical or other shaped bodies of such metals, as copper, and a suitable bonding material, such as tin. These materials are compacted and sintered, or otherwise united, to unify the mixture in a common mass or matrix suitable to receive impregnating materials such as resin and other plastic compounds.

Other objects and features of the invention will appear from the following description taken with reference to the drawings that constitute a part of this specification, and in which:

Fig. 1 is an elevation view of a brake shoe, illustrating the invention as applied thereto;

Fig. 2 is a vertical sectional view, taken substantially on line 2—2 of Fig. 1, illustrating the manner in which the invention is anchored to the brake rim;

Fig. 3 is an enlarged fragmentary sectional view, of the rim of the brake shoe and the lining thereon, illustrating the manner in which the impregnating material has penetrated into the voids of the matrix;

Fig. 4 is an elevation view of a bicycle brake, and

Fig. 5 is a sectional view, taken substantially on line 5—5 of Fig. 4, depicting the cross-section of the bicycle brake.

Referring to the drawings for more specific details of the invention, Fig. 3 depicts generally a porous composite metallic lining, which consists of spherical metal bodies 12 united together with an appropriate bond and impregnated with a suitable plastic material 14.

The spherical bodies 12, commonly designated as shot, are selected from metals, in this instance copper, which possess a relatively high thermal conductivity, and accurately screened to provide the desired uniformity of size.

The element of size is an extremely important factor, because of the control which it exercises over the frictional characteristics of the lining. Tests have been established that the coefficients of friction, exhibited by the lining, will vary directly as the size of the shot; consequently, linings possessed of practically any desired frictional characteristics may be produced.

The shot selected for use is dipped into a bath containing oil, or some other satisfactory binder, before being placed in contact with the bonding material. This procedure insures a reasonably complete and uniform distribution of the bond over the entire surface of the metal bodies.

The bonding material, in this instance powdered tin, is employed in varying quantities depending upon the size of the shot to be used and the strength desired in the lining. The bonding material, in the desired proportions, is then thoroughly commingled with the metal bodies, following which the resultant mixture is introduced into a die.

To prevent the mixture from becoming adhered to the surface of the die during the sintering operation, the forming faces of the die are completely filmed with a graphite paste or some other effective preparation.

Where it is desired, the mixture may be formed, with an appropriate die, directly to the brake shoe as illustrated in Fig. 1. To insure a secure and permanent bond between the rim 18 and the lining 20, however, it is recommended that the adhering surface of the rim 18 be either tinned with a suitable preparation or provided with anchoring recesses 22, such as illustrated in Fig. 2.

The die is then tamped and vibrated to an extent considered adequate to eliminate any existing voids, and effect a close proximity between the constituent ingredients of the mixture.

This compacted mixture is then heat treated or sintered under a reducing atmosphere of hydrogen, or some other equally effective medium, to prevent the formation of undesirable cuprous oxides.

The temperature to which the compact is subjected must be sufficient to effect a fusion between constituent ingredients without exceeding the critical temperature of the shot metal, above which the spherical contours of the shot will be partially or completely destroyed.

If this critical temperature is not exceeded, the bonding material will coalesce and alloy with the shot metal, and form strength members or fillets where the shot are in actual or proximate contact.

This diffusion of the bonding material into the shot metal, which occurs during the sintering operation, extends over the entire periphery of the shot, and is dependent for its penetration upon the length of time and the temperature involved in the sintering operation.

When the sintering operation has been completed, the heat is removed, but the compact is still retained in a reducing atmosphere to further insure against the formation of objectionable cuprous oxides during the cooling period.

After the compact has cooled to room temperature, it is withdrawn from the reducing atmosphere, removed from the die and immersed in an impregnating solution.

The impregnating solution consists of a liquid binder, such as resin, which serves also as a conveyor for the powders of silica, asbestos, or other friction materials, which are added to the solution and carried in colloidal suspension.

The impregnating process is commenced in a rarified atmosphere considerably below atmospheric pressure. This enables any gas, which has become trapped in the voids of the matrix, to escape, and rise to the surface of the impregnating solution in which the compact remains immersed.

After sufficient time has been allowed for the escape of any gas trapped in the matrix, the vacuum is removed and the pressure is increased to several atmospheres to insure a more complete penetration of the impregnating material into the many voids and interstices of the matrix.

When it is determined that the penetration and deposition are adequate, the pressure is relieved, and the compact is placed in a baking oven to effect a fixation of the impregnating material to the matrix, and to facilitate the thermo-setting of the complete mass of intruded material.

The time required for the completion of the baking operation is dependent upon both the type of ingredients contained in the impregnating material, and the temperature maintained in the baking oven.

Upon removal from the baking oven, the compacted material is completely processed and requires no further preparation preliminary to installation and use.

An application of the invention is embodied in a bicycle brake illustrated in Figs. 4 and 5. This brake consists of two semi-circular segments 24, each of which possesses two parallel and concentrically disposed surfaces 26 and 28, connected by bevelled surfaces 30 and 32.

While this invention has been described with reference to the details of a particular modification, it must be appreciated that the principle involved is susceptible of numerous other applications which will occur readily to persons skilled in the art. The invention should, therefore, be limited only as indicated by the scope of the appended claims.

Having thus described the various features of the invention, what I claim as new and desire to secure by Letters Patent is:

1. A sintered structure comprising a porous matrix of copper shot unified by a bonding medium of tin and a frictional compound including a resin vehicle and finely divided asbestos bonded in the pores of the matrix.

2. The method of making a porous metallic structure which comprises uniformly distributing a thoroughly commingled mixture of metal shot substantially uniform in size and metallic powder upon a supporting surface, sintering the metallic powder in a reducing atmosphere, immersing the sintered structure in an impregnating solution including a thermosetting resin and a finely divided frictional agent, reducing pressure over the solution so as to eliminate air from the porous structure, then increasing the pressure to force the solution into the pores and subsequently baking the impregnated structure to set the resin and bind the frictional material in the pores.

DON E. DASHER.

REFERENCES CITED

The following references are of record in the file of this patent:

UNITED STATES PATENTS

| Number | Name | Date |
| --- | --- | --- |
| 1,429,266 | Achtmeyer | Sept. 19, 1922 |
| 1,862,332 | Coffman | June 7, 1932 |
| 1,874,035 | Fletcher | Aug. 30, 1932 |
| 1,960,042 | Andrus | May 22, 1934 |
| 1,973,740 | Andres | Sept. 18, 1934 |
| 2,159,935 | Sanders | May 23, 1939 |
| 2,187,086 | Koehring | Jan. 16, 1940 |
| 2,289,311 | Wellman | July 7, 1942 |
| 2,299,877 | Calkins | Oct. 27, 1942 |